J. Edson.
Hose Coupling.
N° 87,554. Patented Mar. 9, 1869.

Witnesses:
S. N. Piper
J. B. Snow

Inventor,
Jacob Edson
by his attorney
R. H. Eddy

UNITED STATES PATENT OFFICE.

JACOB EDSON, OF BOSTON, MASSACHUSETTS, ASSIGNOR TO JOHN CLARK, OF SAME PLACE.

IMPROVEMENT IN HOSE-COUPLING.

Specification forming part of Letters Patent No. 87,554, dated March 9, 1869.

*To all persons to whom these presents may come:*

Be it known that I, JACOB EDSON, of Boston, in the county of Suffolk and State of Massachusetts, have invented a new and useful Improvement in Hose-Couplings; and do hereby declare the same to be fully described in the following specification, and represented in the accompanying drawings of which—

Figure 1:
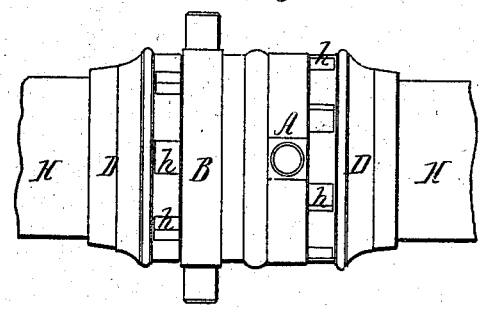
Figure 6:
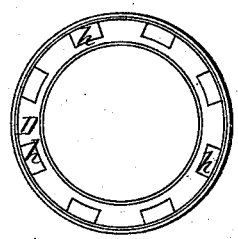
Figure 2:
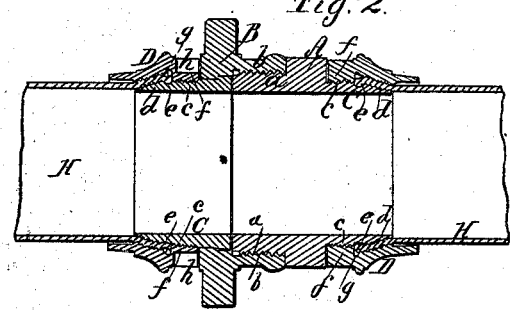
Figure 5:
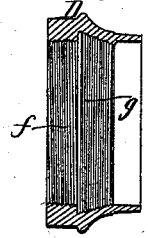
Figure 4:
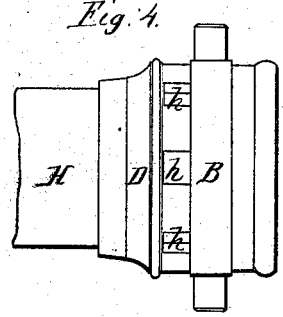
Figure 3:
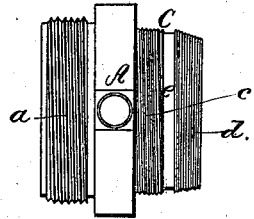

Figure 1 is a front elevation, and Fig. 2 a longitudinal section, of one of my improved couplings. Fig. 3 is a side view of the male-screw connection, and Fig. 4 a side view of the female-screw connection, of the coupling. Fig. 5 is a transverse section of one of the hose-clamping collars, which is applied to each of the said connections. Fig. 6 is an end view of one of the clamping collars or nuts.

The purpose of the said invention is to affix or secure a hose to either of the tubular screw-connections of the coupling.

In the drawings the said screw-connections are represented at A and B, that marked A having a male screw, $a$, to screw into a corresponding female screw, $b$, formed in the connection B, the same being as in other well-known couplings. Each of the connections A B, I provide with a tubular neck, C, to extend from it, in manner as shown. On this neck I form a cylindrical male screw, $c$. In advance of this screw the neck is turned down to the form of a frustum of a cone, as shown at $d$, there being between the base of the frustum and the screw a groove, $e$, which extends around the neck. The neck of the connection B is applied thereto, so as to be capable of being freely revolved therein.

The outer surface of the conic frustum I provide with a series of angular grooves, extending parallel to each other and around it, the whole being as represented in Fig. 3.

On the said male screw $c$ of each neck C, I screw a clamping collar or nut, D, whose bore or interior is not only provided with a female screw, $f$, to receive the screw $c$, but has a frusto conical chamber, $g$, made in it, in manner as represented in the drawings.

The circular inclined sides of the chamber $g$ are provided with a series of parallel grooves extending around them.

Preparatory to the fixation of a hose to either of the connections A B, that end of the hose which is to be attached to such part of the coupling should be passed through one of the clamping collars or nuts, and next be drawn up on the conic frustum of the connection. After this may have been accomplished the said clamping-collar is to be moved up to and screwed upon the male screw of the neck of the connection-piece. While the collar is being screwed up, the walls of its conical chamber will be moved toward the conic frustum of the neck, so as to clamp the hose tightly against and about the neck, and fasten it thereto with a close joint.

The groove $e$ is to enable the end part of the hose to be drawn closely into the neck by twine or cord wound around the hose, preparatory to the screwing up of the clamping-collar. If desirable, cement may be placed in such groove before the application of the hose and the fastening-twine to it.

To enable the collar to be screwed up to advantage, by means of a key or lever applied to it, I form it with a series of apertures, $h$, arranged in it at equal distances apart, and in other respects as represented in the drawings, and particularly in Fig. 6, the same being to receive the lever.

In the drawings the hose is exhibited at H.

I make no claim to a hose-coupling composed of the two connections or parts A B, provided with screws, by which they may be screwed together; nor do I claim the subjects of the Patents Nos. 36,410 and 24,179.

In my improvement the conical-chambered clamping collar or nut encompasses both the neck and its screw and screws upon the latter, and thereby makes a neater and better finish, and is better in other respects than the arrangement of the clamping collar or nut and its connection-screws, as represented in the coupling shown in Patent No. 24,179.

I therefore claim—

1. My improved arrangement of the coupling-screws $c\ f$, chamber $g$, and frustum $d$ of the neck C, and clamping-collar D of each portion, A B, of the hose-coupling.

2. I also claim the arrangement and combination of the groove $e$ with the coupling-screws $c\ f$, the tapering chamber $g$, and frustum $d$ of the neck C, and clamping-collar D.

JACOB EDSON.

Witnesses:
R. H. EDDY,
SAMUEL N. PIPER.